United States Patent
Nicole et al.

(10) Patent No.: US 11,147,281 B2
(45) Date of Patent: Oct. 19, 2021

(54) FRESHNESS OF FRUIT AND/OR VEGETABLES

(71) Applicant: SIGNIFY HOLDING B.V., Eindhoven (NL)

(72) Inventors: Céline Catherine Sarah Nicole, Eindhoven (NL); Daniel Willem Elisabeth Schobben, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 383 days.

(21) Appl. No.: 15/129,966

(22) PCT Filed: Mar. 19, 2015

(86) PCT No.: PCT/EP2015/055774
§ 371 (c)(1),
(2) Date: Sep. 28, 2016

(87) PCT Pub. No.: WO2015/150091
PCT Pub. Date: Oct. 8, 2015

(65) Prior Publication Data
US 2017/0135359 A1  May 18, 2017

(30) Foreign Application Priority Data

Mar. 31, 2014  (EP) ..................................... 14162545

(51) Int. Cl.
*A23B 7/015* (2006.01)
*A23L 3/26* (2006.01)
(Continued)

(52) U.S. Cl.
CPC ................ *A23B 7/015* (2013.01); *A23B 7/04* (2013.01); *A23L 3/26* (2013.01); *F25D 27/005* (2013.01); *A23V 2002/00* (2013.01)

(58) Field of Classification Search
CPC .. A23B 7/05; A23B 7/015; A23B 7/04; F25D 27/005; A23L 3/26
See application file for complete search history.

(56) References Cited

U.S. PATENT DOCUMENTS 8,847,514 B1 *  9/2014  Reynoso ................ A01G 7/045
                                                          315/307
2007/0104841 A1  5/2007  Min et al.
(Continued)

FOREIGN PATENT DOCUMENTS

CN  201149191 Y  11/2008
CN  101374406 A   2/2009
(Continued)

OTHER PUBLICATIONS

D. Goodspeed, et al., "Postharvest Circadian Entrainment Enhances Crop Pest Resistance and Phytochemical Cycling", Current Biology 23, Jul. 8, 2013, pp. 1235-1241.

*Primary Examiner* — Steven N Leff (57) ABSTRACT

A system to illuminate fruit and/or vegetables in the food storage facility, comprising a lamp (8) and a controller (12). The lamp is operable to provide the illumination with a first light output and a second light output, the first light output having a higher intensity and at least a red-bias spectrum relative to the second light output. Further, the system comprises a controller for controlling the illumination of the fruit and/or vegetables in the food storage facility by controlling the lamp. The controller is configured to apply the illumination in a sequence comprising a period of darkness, followed by the first light output for a first period, then followed by the second light output for a second period.

16 Claims, 6 Drawing Sheets

(51) Int. Cl.
*F25D 27/00* (2006.01)
*A23B 7/04* (2006.01)

(56) References Cited

U.S. PATENT DOCUMENTS

| | | |
|---|---|---|
| 2007/0236952 A1 | 10/2007 | Tseng |
| 2007/0268682 A1 | 11/2007 | Kim et al. |
| 2008/0203936 A1* | 8/2008 | Mariyama .......... H05B 33/0815 |
| | | 315/246 |
| 2010/0134037 A1 | 6/2010 | Huber et al. |
| 2012/0124903 A1 | 5/2012 | Takeuchi |
| 2013/0162160 A1 | 6/2013 | Ganton et al. |

FOREIGN PATENT DOCUMENTS

| | | |
|---|---|---|
| CN | 203249007 U | 10/2013 |
| EP | 2128546 A1 | 12/2009 |
| EP | 2385332 B1 | 1/2014 |
| JP | 2006329614 A | 12/2006 |
| JP | 2012179009 A | 9/2012 |
| WO | 2007068645 A1 | 6/2007 |
| WO | WO2008004743 A1 | 1/2008 |
| WO | WO2013072701 A1 | 5/2013 |

* cited by examiner

FRESHNESS OF FRUIT AND/OR VEGETABLES

CROSS-REFERENCE TO PRIOR APPLICATIONS

This application is the U.S. National Phase application under 35 U.S.C. § 371 of International Application No. PCT/EP2015/055774, filed on Mar. 19, 2015, which claims the benefit of European Patent Application No. 14162545.9, filed on Mar. 31, 2014. These applications are hereby incorporated by reference herein.

TECHNICAL FIELD

The present disclosure relates to the conditions under which fruit and vegetables are stored and/or transported, with a view to keeping them fresh.

BACKGROUND

In retail and consumer markets the largest waste of food lies with fresh fruits and vegetables. At a time when the horticulture industry is struggling to produce more for the increasing world population, waste is not managed well and in fact food waste seems to be on the increase. Improved storage of fresh food is therefore a growing concern and a necessity for the future.

Most fruit and vegetables in the world are grown under a circadian rhythm, linked to the daily cycle of light and darkness. This rhythm regulates carbohydrates and other secondary metabolites in fruit and vegetables during growth and during post-harvest storage. In the food chain, the circadian rhythm is disturbed during transport and storage as well as in the refrigerator of the consumer.

Researchers from Rice University (USA) recently studied the circadian rhythm of post-harvest fruit and vegetables [Goodspeed D., 2013, "Postharvest Circadian Entrainment Enhances Crop Pest Resistance and Phytochemical Cycling", Current Biology 23, 1235-1241, Jul. 8, 2013, Elsevier Ltd]. They found that when cabbage was stored under 12 hour light-dark cycles, this provides two to three times more phytochemicals if eaten four to eight hours after the beginning of the light period than if the cabbage were stored under constant light or constant darkness. Comparable responses were found in lettuce, spinach, zucchini, sweet potatoes, carrots, and blueberries. The response was found to be similar to the way in which light-dark cycles in the field trigger cell metabolism to lessen damage to fruits and vegetables from insects.

In the literature there is other evidence that fresh leafy vegetables and some fruit would benefit from a lighting exposure after harvest in order to maintain quality. These include documents describing ways of keeping food fresh on the cooled shelves in supermarkets or in a home refrigerator. For example see US20070104841 ["Refrigerator and method for keeping food using the same", LG Electronics].

Despite the existing literature in this field to show that the effect exits, there remains some uncertainty about the underlying mechanism, and more practically how it may be exploited more effectively.

SUMMARY

The inventors believe that photosynthesis is not involved (or at least not exclusively) when light is applied to keep fruit and vegetables fresh longer, but rather other mechanisms in the plant are at work. One reason to believe this is that low light intensity also appears to have a positive effect, while at low intensity photosynthetic activity was measured to be inexistent. This led to the thought that there would be room for innovation in this area, because most prior systems so far are based on the hypothesis of a photosynthetic process.

The inventors recently studied the effect of lighting on post-harvest lettuce and cucumber in their laboratory to check the claims that post-harvest light cycles can improve freshness, and furthermore to see if they could find a way to achieve such results in a more practical, energy efficient way. For this purpose the inventors conducted several experiments in a climate chamber (similar to refrigeration storage conditions), applying light of different intensity, spectrum and dynamic rhythms.

Light, light intensity and spectrum were observed to have an effect on freshness (measured in terms of various factors such as hue of the food, glucose content and fructose content). Further, there was also observed to be a rather strong effect achieved by applying a dynamic light regime. For example having lettuces illuminated for 2 hours with a medium or high light level, and then returning to a lower background light level, had the effect of keeping the lettuce fresh longer. This dynamic light regime was applied after a totally dark period (e.g. 12 hours), and so in this sense may be referred to as a "wake-up light" to the analogy with the response of the human circadian rhythm to "wake-up" light lamps.

Based on this observation, the following discloses an arrangement for overcoming the disturbance in circadian rhythm that may occur in the transport and/or storage of fruit and/or vegetables, with the aim to enhance nutritional compounds and keep food fresh longer. The technique comprises applying a dynamic light regime or "dynamic light recipe" comprising a "wake-up" phase of high intensity red light, followed by a "day" phase of "regular" low intensity (e.g. as would be used for regular retail illumination).

The invention is defined by the independent claims; the dependent claims define advantageous embodiments.

Hence according to one aspect disclosed herein, there is provided a system comprising a food storage facility for storage of fruit and/or vegetables, and a lamp arranged to illuminate the fruit and/or vegetables in the food storage facility. The lamp is operable to provide the illumination with a first light output and a second light output, the first light output having a higher intensity and at least a red-bias spectrum relative to the second light output. Further, the system comprises a controller for controlling the illumination of the fruit and/or vegetables in the food storage facility by controlling the lamp. The controller is configured to apply the illumination in a sequence comprising a period of darkness, followed by a first period of the first light output, then followed by a second period of the second light output.

According to embodiments, the first light output preferably has a spectrum with a peak wavelength of about 660 nm, or else a peak in the red region (approximately 620 to 740 nm) of the visible spectrum. In embodiments the second light output has a substantially white spectrum.

In embodiments the first (red bias) light output has an intensity in the range 15 to 50 $\mu mol/s/m^2$, preferably about 40 $\mu mol/s/m^2$. In embodiments the second light output has an intensity of 2 to 15 $\mu mol/s/m^2$.

According to further embodiments, the first and second light outputs are preferably discrete channels of the lamp with discrete spectra and/or intensity being applied for a first period and second period respectively. For example the system may use a dual channel lamp made up of red and white LEDs. The first and second light outputs may have constant spectra and/or intensity within the respective period.

In embodiments the period of darkness, first period and second period are contiguous with one another (one follows straight after the other).

The disclosed arrangement may be applied for the storage and/or transport of fresh food in retail, and/or the storage of food in the consumer's domain (e.g. in the home). Hence in embodiments said food storage facility may comprise a retail display, or said food storage facility may comprise an interior of a refrigerator.

For instance, the controller may be configured to apply said sequence in a daily cycle. In one such embodiment, the sequence comprises: the period of darkness lasting for 10 to 12 hours; followed by the first (high intensity red) light output applied for a first period lasting 1 to 2 hours; followed by the second (e.g. low intensity white) light output applied for a second period following the first period, wherein the second period may last for the remainder of the daily cycle, or may last a period of 2 to 6 hours which may be followed by a period of ambient light from elsewhere. An example use of this set up would be in a retail display, in which case the fruit and/or vegetables on display would be illuminated with the high intensity red light for a first "wake-up" period in the morning, followed by "normal" lighting for the rest of the day.

In another example, the controller may be configured to time said sequence to cumulate at a designated consumption time, designated by a user for consumption of at least some of the fruit and/or vegetables. In one such embodiment, the controller may be configured to apply the second (e.g. low intensity white) light output for a second period lasting 2 to 4 hours up until the consumption time, and to apply the first (high intensity red) light output for a first period lasting 1 to 2 hours up until the second period. For instance the lighting may be incorporated in a refrigerator, with a user interface allowing the user to set a later time at which one or more fruit and/or vegetables in the refrigerator will be required for a meal or for the preparation of a meal. The lighting sequence would then turn on automatically leading up to that pre-set time, with a period of white light leading up to the set time, preceded by a period of the red "wake-up" light.

According to a further aspect disclosed herein, there may be provided a computer program product embodied on a computer readable storage device and configured so as when executed on a processor to perform operations of the controller in accordance with any of the features disclosed herein. According to a further aspect, there may be provided a controller configured in accordance with any of the features disclosed herein. According to a further aspect, there may be provided a corresponding method of illuminating fruit and/or vegetables in accordance with any of the features disclosed herein.

BRIEF DESCRIPTION OF THE DRAWINGS

To assist in the understanding of the present disclosure and to show how embodiments may be put in effect, reference is made by way of example to the accompanying drawings in which.

DETAILED DESCRIPTION OF EMBODIMENTS

To study the effects discussed herein, lettuces and cucumbers were stored in a temperature and humidity controlled climate chamber. The air flow in the chamber had a $CO_2$ concentration around 700 to 800 ppm. For lettuces, the storage temperature was 6° C. and relative humidity was 95% RH, but for cucumbers it was 12° C. and 95% RH. Those conditions are those recommended by the grower. All the materials were stored in these stable conditions during 2 weeks for each experiment. After two weeks the salads were old enough to be discarded, the same way they would in retail.

FIGS. 3 to 11 give an example of the results obtained for mature leaves of butter-head lettuce. In this experiment, a high intensity wake-up light from red LEDs was applied for two hours per day, followed by a period of medium to low intensity white illumination or low light level. Freshness can be measured in a number of ways, such as by the amount of phytochemical in the beginning versus the end of life of the vegetables, and by the "look" of the lettuce by for example measuring the hue color of the leaves.

It was found that the wake-up light works best, in terms of maintaining freshness, when followed by a low light period as would be the case if the salad crop is face down (often done in supermarkets) or is placed on the shelves shadowed by the shelf above (also very often the case in refrigerator shelves). The graphs show that the hue can be maintained with time, as well as the sugars (sucrose, fructose, glucose) and vitamin C.

Figure 3:
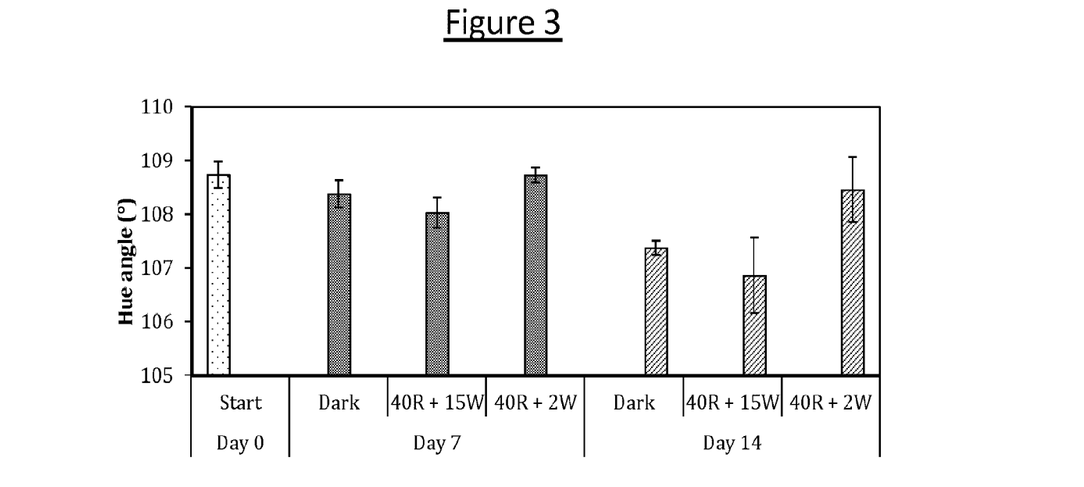
FIG. 3 is a graph showing a change in the hue angle in the color of leaves from a lettuce treated with a cycle of illumination from a dual-channel lamp.

FIG. 3 is a graph showing the change in hue angle observed in lettuce leaves treated with a daily cycle of red light at a high intensity of 40 µmol/s/m$^2$ for 2 hours as a wake-up light, followed by white light at a low intensity of 2 µmol/s/m$^2$ (labelled "40R+2W") or a medium intensity of 15 µmol/s/m$^2$ ("40R+15W") for 10 hours (and 12 hours darkness), over a course of 2 weeks. The results are shown in context of a control in which the lettuce was kept dark all day. A micromole per second per square meter (µmol/s/m$^2$)

is the number of photons falling on one square meter each second, one mole being $6.02 \times 10^{23}$ (Avogadro's number). 10 $\mu mol/m^2/s \approx 685$ Lux $\approx 2.18$ W/m$^2$. Hue angle is measured in degrees where 60° is yellow and 120° is green. The yellower leaf has more chlorophyll breakdown. Each value was the average of three spots from the top, middle and bottom of the leaf.

Figure 4:
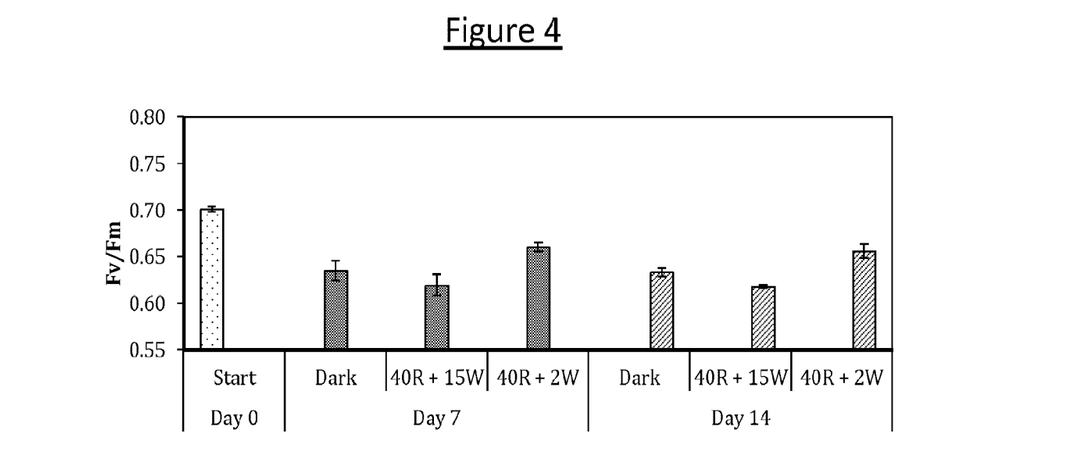
FIG. 4 is a graph showing a change in the photosynthetic capacity of leaves from a lettuce treated with a cycle of illumination from a dual-channel lamp.

FIG. 4 shows the result of the same treatment regime on the photosynthetic capacity of the leaves. When light photons are absorbed by a chlorophyll molecule, they cause an instantaneous rearrangement of electrons in the molecule, and lead the pigment molecule from a ground state to an excited state with a lifetime of $10^{-9}$ s. The unstable excited state causes part of the excitation energy to be converted to vibrational energy, dissipated as heat and re-emitted as less energetic photons, where the reemitted light is chlorophyll fluorescence and has an emission peak around 730 nm. Apart from the energy loss as heat and fluorescence, the trapped energy can be used to activate electrons and starts linear electron transport chain (LET) at photosystem II (PSII) to be the driving force of photosynthesis. When a leaf is adapted to dark conditions, the minimal fluorescence ($F_0$) is measured with only weak measurement light present. When a saturation pulse is then applied, the chlorophyll can hardly trap any energy from the suddenly irradiated light of the saturation pulse due to the PSII centre being closed, such that the remitted fluorescence is the maximal (Fm). For a dark-adapted leaf, the ratio Fv/Fm is defined as the maximal quantum efficiency of PSII photochemistry where Fv=Fm−$F_0$. A higher value of Fv/Fm indicates higher photosynthetic capacity and healthier situation of the leaf. In each measurement, one or two mature leaves from the fourth outer layer of a lettuce were picked off to measure chlorophyll fluorescence.

For the photosynthetic capacity during 2 weeks, the values were decreased for all treatments after 7 days and kept the same level in the second week. Lettuces treated with extremely low white (2 $\mu mol/s/m^2$) after wake-up red light however maintained the highest photosynthetic capacity and healthiest leaves.

Figure 5:
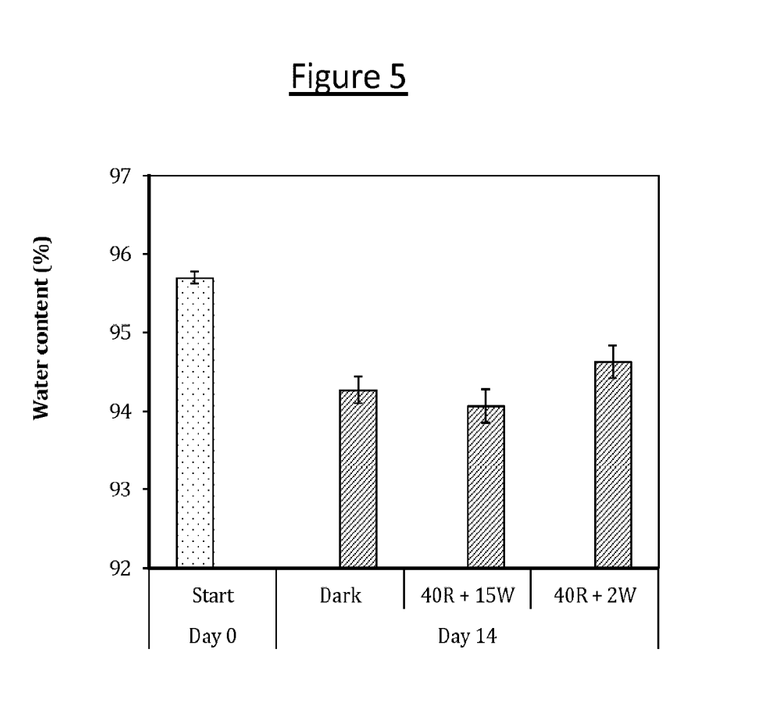
FIG. 5 is a graph showing a change in the water content of leaves from a lettuce treated with a cycle of illumination from a dual-channel lamp.
Figure 6:
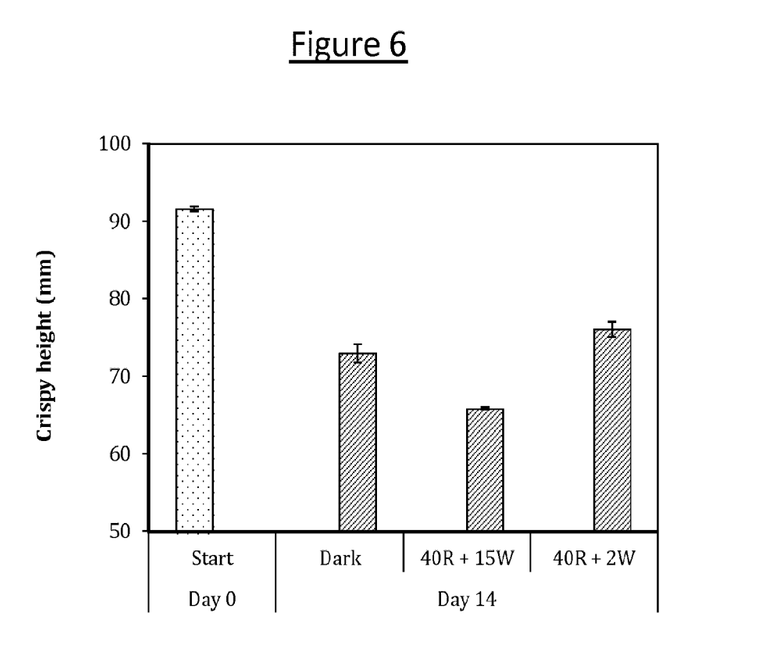
FIG. 6 is a graph showing a change in the crispiness of leaves from a lettuce treated with a cycle of illumination from a dual-channel lamp.
Figure 7:
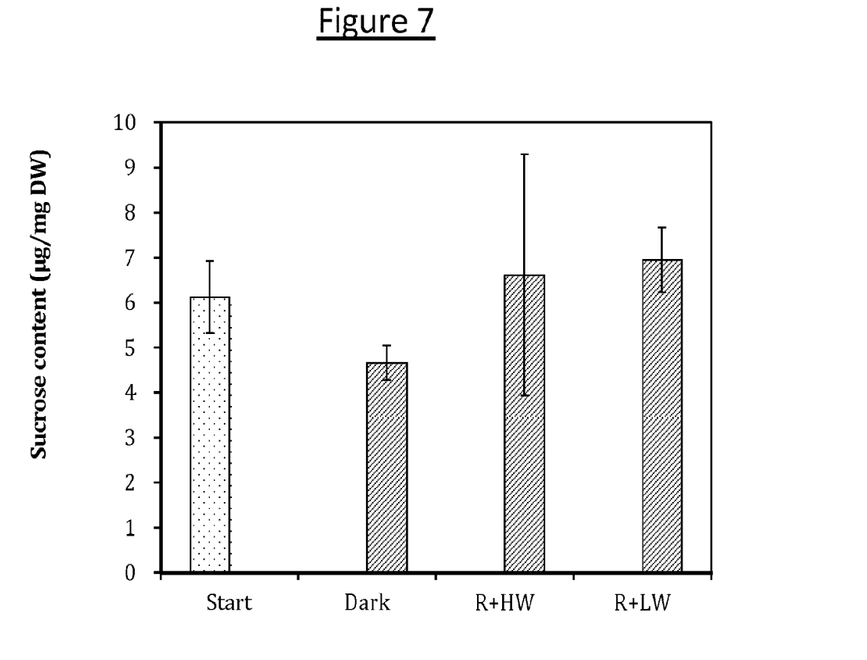
FIG. 7 is a graph showing a change in sucrose content in leaves from a lettuce treated with a cycle of illumination from a dual-channel lamp.
Figure 8:
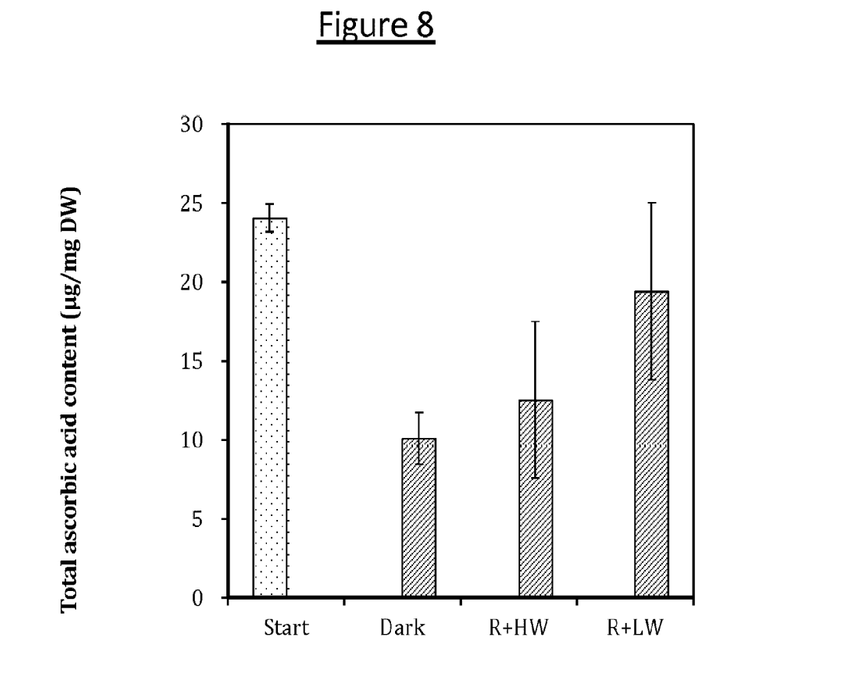
FIG. 8 is a graph showing a change in ascorbic acid content in leaves from a lettuce treated with a cycle of illumination from a dual-channel lamp.
Figure 9:
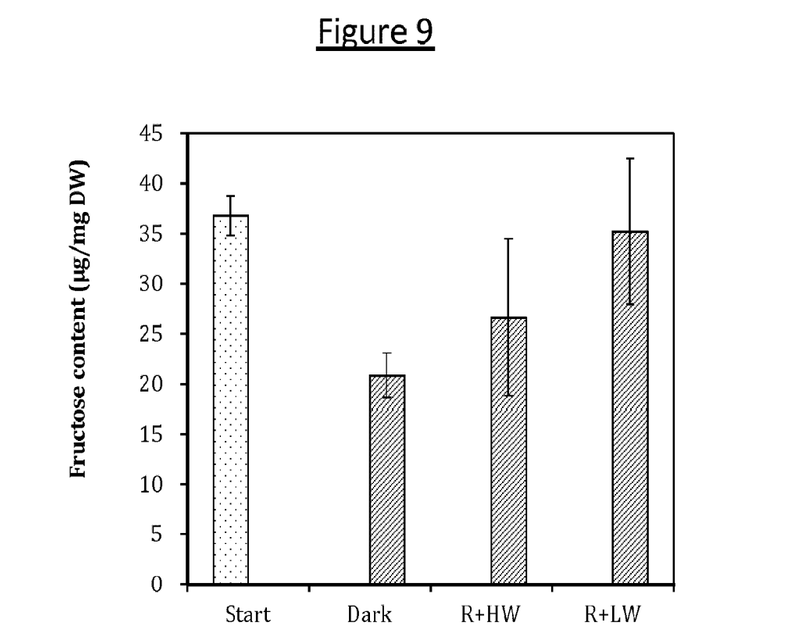
FIG. 9 is a graph showing a change in fructose content in leaves from lettuce treated with a cycle of illumination from a dual-channel lamp.
Figure 10:
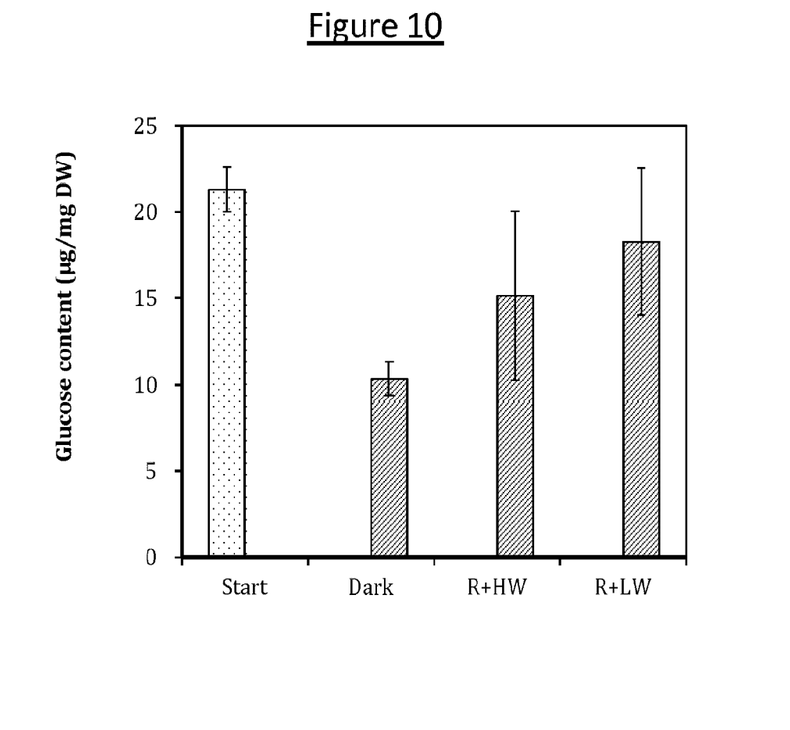
FIG. 10 is a graph showing a change in glucose content in leaves from lettuce treated with a cycle of illumination from a dual-channel lamp.

FIGS. 5 and 6 show the result of the treatment on water content and "crispy height" of the leaves. "Crispy height" was the height of 100 gram fresh-sliced lettuce leaves in a plastic bag. A higher level indicates that leaves are crispier. At the beginning of an experiment, three fresh lettuces were selected. For each lettuce, all the leaves were picked off and cut by scissors to be slices in around 1 cm broad, and then mixed properly. Next, 100 gram slices were weighed as one sample and put in a plastic bag (22×25 cm polyethylene bags), and the height of sliced leaves was measured after shaking in the flat-closed bag. For each sample, the crispy height was measured three times to get average value. At the end of the experiment, the crispy height of every lettuce was measured.

After 2 weeks storage in the same climate chamber with 6° C. and 95% RH, the water content of leaves was decreased for all treatments without significant difference. However, the extremely low white light (2 $\mu mol/s/m^2$) after wake-up red had the most crispy leaves, while medium white (2 $\mu mol/s/m^2$) after wake-up red caused the fastest softening of lettuce leaves. Greenish coloration was kept at the same level as the beginning of the experiment after one week storage for all treatments, but at day 14 the groups of dark stored and wake-up red with medium white (15 $\mu mol/s/m^2$) had degradation of green color to yellow. The lettuces radiated by low white light (2 $\mu mol/s/m^2$) after 2 hours wake-up by red light maintained the best coloration of mature green leaves compared to the start of the experiment.

The graphs of FIGS. 7 to 10 show the change in (FIG. 7) sucrose content, (FIG. 8) ascorbic acid content, (FIG. 9) fructose content, and (FIG. 10) glucose content, observed in lettuce leaves treated with a daily cycle of red light at a high intensity of 40 $\mu mol/s/m^2$ for 2 hours as a wake-up light, followed by white light at a low intensity of 2 $\mu mol/s/m^2$. These are the results labelled "R+LW". They are shown in context of a control in which the lettuce was kept dark all day, and in which the white light was of equal, high intensity (40 $\mu mol/s/m^2$) to the red light ("R+HW"). The content is shown measured in micrograms per milligram of lettuce (dry weight, DW).

Figure 11:
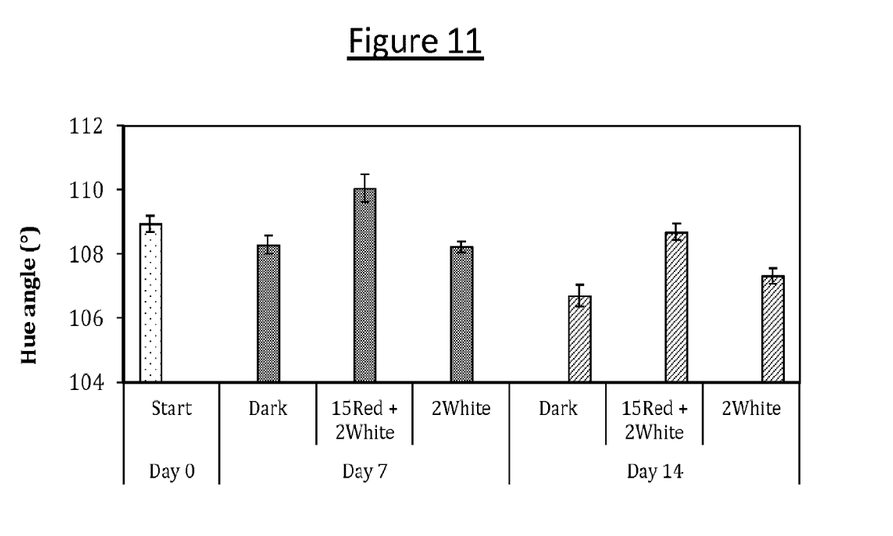
FIG. 11 is another graph showing a change in the hue angle in the color of leaves from a lettuce treated with a cycle of illumination from a dual-channel lamp.

The intensity of the red light applied during the wake-up period can also be increased to an even higher intensity level of at least 50 $\mu mol/s/m^2$. Regarding the effect of a lower intensity red light, when the experiment was performed with a period of the red wake-up light at an intensity set to a medium level of 15 $\mu mol/s/m^2$ (followed again by a low white light of 2 $\mu mol/s/m^2$), this was found to keep the leaves with at least a greener color. Hence a treatment including a red wake-up light with an intensity down to this level of intensity may still be of some benefit, at least cosmetically (e.g. for the purpose of a retail display). This result is shown in FIG. 11 (in context of a dark control and a white-only treatment).

Thus a regime of red and white supplemental light during storage can maintain post-harvest qualities of lettuces, including crispiness, greenish coloration, photosynthetic capacity and sugar contents and vitamin C level. This improvement in freshness provides the salad with more nutrient content, more antioxidant to stay fresh longer, and reduces waste in the food chain. There is therefore the potential to provide a significant advantage by applying a regime of dynamic light treatment during transport and/or storage of fresh fruit and/or vegetables (particularly leafy vegetables); specifically a sequence comprising a period of dark followed by a period of high intensity red wake-up light, followed by a period of lower intensity white light. Example opportunities for exploiting this in the retail environment and in the home are now discussed.

Figure 1:
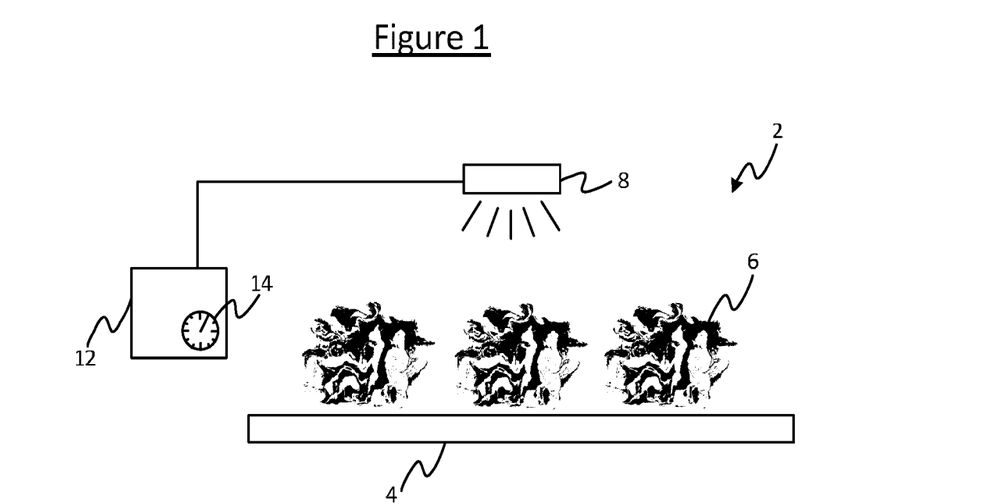
FIG. 1 is a schematic representation of a lighting system in a retail environment.

FIG. 1 illustrates an embodiment implemented in a retail environment 2. The system comprises a food storage facility in the form of a retail display comprising one or more shelves or stands of a shop, market stall, food counter or the like for storing (and at the same time displaying) one or more types of fruit and/or vegetables 6. The system further comprises a lamp 8 arranged to illuminate the fruit and/or vegetables in the display 4, and a controller 12 connected to the lamp 8 and arranged to control this illumination being output by the lamp. The lamp 8 has (at least) a two channel output, one channel providing a high intensity red "wake-up" light (preferably red color at approximately 660 nm) and the other channel providing a lower intensity "normal" or "background level" illumination for the display 4 (preferably white, but at least less red). The two channels may be implemented by means of red LEDs respectively normal or white LEDs. Thus the two channels of the lamp provide two discrete, substantially different light outputs arranged to illuminate the fruit and/or vegetables 6 in the display 4 during different respective periods (preferably also being constant within each period). The controller 12 is configured to control the switching between these channels (and switching the lamp on and off) to provide a dynamic light regime, in order to maintain the freshness of the fruit and/or vegetables 6 by manipulation of their circadian rhythm.

To this end, the controller 12 comprises a timer 14 configured to trigger the starting time of the wake-up light. In embodiments, the controller 12 may comprise a portion of software code embodied on a computer readable storage device (comprising one or more storage media) and arranged for execution on a processor (comprising one or more processing units). Alternatively the controller 12 may be partially or wholly implemented in dedicated hardware circuitry, or configurable or reconfigurable circuitry such as a PGA or FPGA.

The controller 12, using its timer 14, is thus configured to control the lamp 8 to illuminate the fruit and/or vegetables 6 in the display 4 with a dynamic light regime in the form of a sequence comprising a period of darkness, a first period of higher intensity red-bias light, and a second period of further light such as white light or a regular retail lighting; e.g. in embodiments in accordance with one of the following examples.

The light regime may be applied in a daily, 24 hour cycle. In embodiments, the high intensity red wake-up light (preferably about 660 nm) is turned on after a long period of darkness (e.g. 10 to 12 hrs), and preferably is applied for a period of between 1 and 2 hours. After the wake-up light, the dual channel lamp 8 is switched to "normal" retail illumination for the remainder of the day (so up to 13 hours), until the cycle begins again with the next period of darkness and so forth.

In an alternative, after a long dark period (e.g. 10 to 12 hours), the red wake-up light is switched on for 1 to 2 hours followed by 2 to 6 hours white low. In some scenarios the 1-2 hours plus 2-6 hours may account for the full length of the daytime, as far north or south daytime may only last 2 to 8 hours in winter. In other seasons or latitudes however the daytime may last longer than 8 hours. Hence if the 1-2 hour red wake-up light plus 2-6 hour specifically or deliberately applied white light does not account for a full 24 hour cycle, the fruit and/or vegetables 6 may continue to be illuminated by ambient light for the rest of the day—i.e. light made up of general purpose artificial light that happens to be in the environment (e.g. room light) or natural light (sunlight, e.g. entering through a shop window in the case of a retail display).

The cycle may be applied substantially in synchronisation with the cycle of the day, with the period of darkness being timed to coincide with night, the wake-up light starting in the morning and the second "normal" and/or ambient light being applied throughout the rest of the day. Alternatively the cycle could be applied out of synchronisation with the cycle of the day (to artificially simulate a different time of day), e.g. in a shop or stall operating at night or otherwise out of sync with the day, such as in an airport or all-night convenience store. Further, in embodiments, the cycle may adapt to the day length of the current season, or adapt out of synchronisation with the current season (to artificially simulate a different time of year), or may stay constant despite the season.

Figure 2:
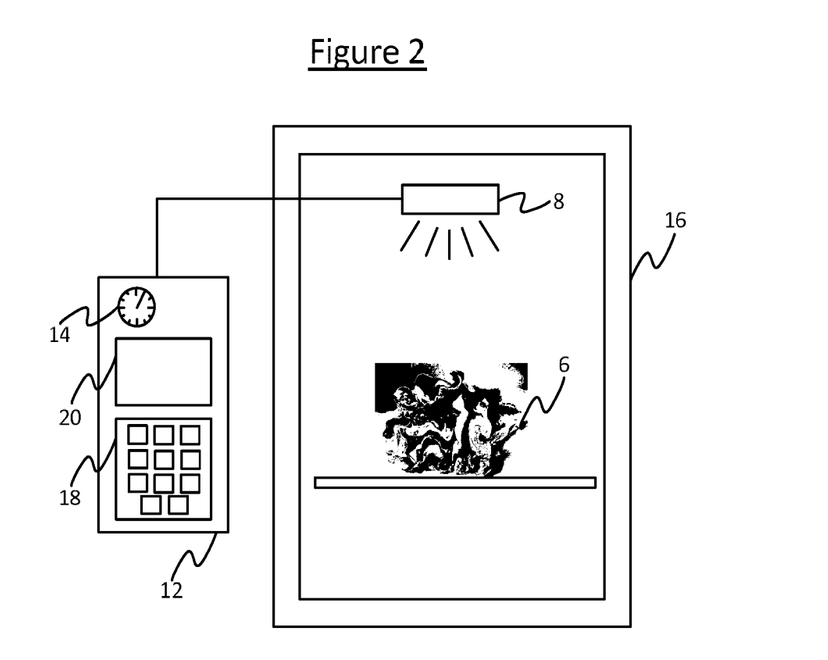
FIG. 2 is a schematic representation of a lighting system for a refrigerator.

FIG. 2 illustrates another embodiment, implemented in a refrigerator 16. In this case the food storage facility is the refrigerator 16 and the lamp 8 is arranged within the refrigerator 16 to illuminate its interior, or at least one or more compartments, shelves or regions where one or more fruits and/or vegetables 6 are to be stored. The lamp 8 is again a dual channel lamp operable to illuminate the fruit and/or vegetables 6 with a high intensity red wake-up light and a lower intensity white light during different respective periods, again being controlled by a controller 12 comprising a timer 14. Furthermore, the controller 12 comprises a user interface comprising a user input means 18 and optionally a display 20. For example the user interface may comprise a keypad, touch screen, or a port (e.g. USB, Wi-Fi, Zigbee or Bluetooth) for receiving an input from a desktop or laptop computer, tablet or smart phone. The user interface may be integrated into the refrigerator 16 or may be external to it.

The user interface allows the user to set the timing of the lighting regime applied to the food 6 by the lamp 8, for example as follows.

As mentioned, researchers from Rice University (USA) found that when cabbage was stored under 12 hour light-dark cycles (12 hours darkness, 12 hours white light), it provided two to three times more phytochemicals if eaten four to eight hours after the beginning of the light period than if the cabbage was stored under constant light or constant darkness. Building on this, in an alternative embodiment disclosed herein, the red wake-up light is therefore used to shift the circadian clock of the fruit and/or vegetables as a function of estimated time of consumption. For example a home refrigerator may be provided with a controller/timer and a lamp for illuminating the fruit and/or the vegetables with low intensity light for a period of a couple of hours before estimated consumption, preceded with the high intensity wake-up light for 1 to 2 hrs. This dynamic lighting scheme would provide a maximum amount of phytochemical and nutrients at the time of consumption.

Since the fruit and/or vegetables are with the consumer and the consuming moment can be known, the controller 12 is configured to allow the consumer to enter a time at which he or she wishes the fruit and/vegetable to be in an optimum state (the time of evening dinner for example) in such a way that the circadian rhythm would be adapted to have a maximum of phytochemicals concentration at the time of consumption (or preparation). The controller 12 is equipped with a clock 14, and program and reset buttons 18 (or other form of user input device). The program buttons can be used to program the controller 12 to memorize the time at which the vegetables should be optimum. The display 20 associated with the clock may display the circadian rhythm to be programmed to turn on and off the LEDs in the lamp, for example: high level (1 to 2 hours) and lower level (2 to 4 hours). After that cycle the phytochemical and the freshness of the salad is approximately optimum for consumption. The controller 12 could also have a day counting option to inform the user about the freshness status as a function of time and giving advice as to whether the vegetables are still fresh enough to be eaten.

It will be appreciated that the above embodiments have been described only by way of example.

For instance, although above the daily cycle has been disclosed in the context of a retail display, this could also be used in a refrigerator or any other food storage facility for the storage of fruit and/or vegetables. Conversely, the idea of a sequence timed to cumulate at a programmed consumption or preparation time could be used in a retail environment, e.g. a salad bar of a restaurant, café or canteen having a wake-up sequence timed to come on before opening time, lunch or dinner time or a peak business time.

Generally the treatments described above may be used for storage of post-harvest or detached fruit and/or vegetables. Detached fruit or vegetables include those which are harvested earlier than normal time but continue to ripen and/or grow while detached from the main plant, or from the roots or tree. Alternatively or additionally, the treatment may be used for the storage of "pre-harvested" fruit and/or vegetables, i.e. shortly before harvest (e.g. 48 hours or so). For example some lettuces are sold with the roots in pots, as are *Basillicum* and other herbs.

While the above has been described in terms of a lamp comprising one or more LEDs, other types of light source could alternatively or additionally be used to implement the lamp. The main advantages of using LEDs result from the possibility to control the spectral composition of the light to closely match plant photoreceptors to provide more optimal production, to influence plant morphology and composition and to improve quality of products. Other advantages of using LEDs are related to improved control of heat production and the freedom of distributing them to optimize uniformity of the lighting, and longer life-span to maintain useful light output for years without replacement. It also promises a reduced energy consumption and associated cost reduction. Nonetheless, other kinds of lamp could also be used to create the desired intensity and spectrum (e.g. a white filament bulb or fluorescent tube plus filter). Note also that the term lamp does not necessarily imply a single light source, and generally the lamp referred to herein may comprise one or more light sources of one or more types implemented in one or more units or housings.

Based on the experiments performed, the white light may be in the range 2 to 15 $\mu mol/s/m^2$ and is preferably less than 15 $\mu mol/s/m^2$, in embodiments 10 $\mu mol/s/m^2$ or less. The red wake-up light is preferably 40 $\mu mol/s/m^2$, but in embodiments could be in the range 15 to 50 $\mu mol/s/m^2$ or higher. Also between the embodiments discussed above, the period of darkness may be 10 to 12 hours, the first period (of red wake-up light) may be 1 to 2 hours following the period of darkness, and the second period (the period of normal white or non-red bias light following the red wake-up light) may be 2 to 13 hours following the first period (and there may or may not be a period of ambient light between the second period and the next period of darkness). Nonetheless, skilled person may choose other periods, and/or combinations of intensity and wavelengths having been given the concepts disclosed herein. For example, the period of darkness could be shorter, e.g. as low as 8 or even 6 hours; or the red wake-up period could be longer, e.g. up to 3 or even 4 hours.

In embodiments the red-wakeup light first preferably has a spectrum with a peak wavelength of about 660 nm, but more generally may have any spectrum with a red-bias, e.g. having a peak in the red region (approximately 620 to 740 nm) of the visible spectrum, or spectral density distribution that is weighted towards the red end of the visible spectrum. Further, where it is said that the second light output has a substantially white spectrum, different types of white light can be used, e.g. warm or warm or cold. The white light could either be formed from a "strictly white" uniform spectral density across the visible spectrum, or alternatively a non-uniform spectrum that is substantially white, e.g. with discrete components but with a substantive mix of components across the visible spectrum. Preferably however the white light consists of only light in the visible spectrum, or at least substantially no UV which can damage tissues, and/or substantially no infrared compounds which would generate heat and therefore dehydration.

Further, the different light outputs of the lamp are preferably discrete channels of the lamp having discrete spectra and/or intensities relative to one another, and in embodiments the spectrum and/or intensity is substantially constant throughout the period in which the respective light output of each respective channel is being emitted. Nonetheless, in alternative embodiments it is not excluded that the color of the red wake-up light could for example fade into the "normal" white light, or the intensity of the wake-up light could ramp down to the normal light; or that the wake-up light could fade or ramp in from the period of darkness, or that the white or normal light of the second period could fade or ramp back to the next period of darkness; or such like. Further, the period of darkness and the respective first and second period of these two light outputs are preferably all contiguous with one another (the one begins immediately after the end of the other). However, it is not excluded that there could be short gaps or other "buffer" lights or periods applied in between.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting system comprising:
 a lamp for illuminating plant items in a storage facility, wherein the lamp is arranged to provide said illumination with a first light output and a second light output, the first light output having a higher intensity and at least a red-bias spectrum relative to the second light output, wherein the second light output is white; and
 a hardware processor configured to produce, by controlling the lamp, a light sequence, the sequence comprising an off period, in which said lamp is off, followed by the first light output for a first period, then followed by the second light output for a second period,
 wherein the first period lasts 1 to 2 hours and wherein the second period lasts at least two hours,
 wherein a total of 15 to 50 $\mu mol/s/m^2$ of photons are emitted by the system for the first light output throughout the first period, and
 wherein a total of 2 to 15 $\mu mol/s/m^2$ of photons are emitted by the system for the second light output throughout the second period, wherein said total of the second light output is less than said total of the first light output.

2. The system of claim 1, wherein the first light output has a spectrum with a peak wavelength of 660 nm.

3. The system of claim 1, wherein the hardware processor is configured to apply said sequence in a daily cycle.

4. The system of claim 3, wherein:
 the off period lasts 10 to 12 hours and
 the second period lasts the remainder of the daily cycle following the first period, or lasts a period of 2 to 6 hours.

5. The system of claim 4, wherein the plant items are food items and wherein the storage facility is a food storage facility.

6. The system of claim 1, wherein said plant items comprise fruit and/or vegetables and wherein the hardware processor is configured to time said sequence to cumulate at a designated consumption time, designated by a user, for consumption of at least some of the fruit and/or vegetables disposed in the storage facility.

7. The system of claim 6, wherein the second period lasts 2 to 4 hours up until the consumption time, and the first period lasts 1 to 2 hours up until the second period.

8. The system of claim 7, wherein the plant items are food items and wherein the storage facility is a food storage facility.

9. The system of claim 1, wherein the first and second light outputs are discrete channels of the lamp with discrete spectra and intensity being applied for the first period and second period respectively.

10. The system of claim 1, wherein the first and second light outputs have constant spectra within the respective period.

11. The system of claim 1, wherein the off period of darkness, the first period and the second period are contiguous.

12. The system of claim 11, wherein said total of said second light output is at least 7.5 times less than said total of said first light output.

13. The system of claim 1, wherein the plant items are food items and wherein the storage facility is a food storage facility.

14. The system of claim 1, further comprising:

a user interface, wherein the controller hardware processor is configured to determine an initiation time of said sequence based on a designated consumption time received from a user such that said second period sequence culminates cumulates at the designated consumption time, wherein the consumption time is designated by a user, through the user interface, as being a time for consumption of at least some of said items.

15. The system of claim 14, wherein the second period lasts 2 to 4 hours up until the consumption time, and the first period lasts 1 to 2 hours up until the second period.

16. The system of claim 1, wherein said total of said second light output is at least 7.5 times less than said total of said first light output.

* * * * *